(12) United States Patent
McClanahan et al.

(10) Patent No.: US 8,239,893 B2
(45) Date of Patent: Aug. 7, 2012

(54) CUSTOM CHANNELS

(75) Inventors: Joseph McClanahan, Redmond, WA (US); Mark Schwesinger, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 638 days.

(21) Appl. No.: 12/119,383

(22) Filed: May 12, 2008

(65) Prior Publication Data

US 2009/0320072 A1 Dec. 24, 2009

(51) Int. Cl.
H04N 5/445 (2011.01)

(52) U.S. Cl. ........... 725/47; 725/39; 725/45; 725/51; 725/52; 725/53

(58) Field of Classification Search .......... 725/39, 725/47, 45, 51, 52, 53
See application file for complete search history.

(56) References Cited

U.S. PATENT DOCUMENTS

| | | | |
|---|---|---|---|
| 5,585,866 A | 12/1996 | Miller et al. | |
| 5,914,746 A * | 6/1999 | Matthews et al. | 725/132 |
| 5,978,043 A | 11/1999 | Blonstein et al. | |
| 6,601,237 B1 * | 7/2003 | Ten Kate et al. | 725/47 |
| 2002/0080166 A1 * | 6/2002 | Sweatt et al. | 345/738 |
| 2002/0143629 A1 * | 10/2002 | Mineyama et al. | 705/14 |
| 2005/0273833 A1 | 12/2005 | Soinio | |
| 2006/0041921 A1 | 2/2006 | Hane | |
| 2006/0123455 A1 * | 6/2006 | Pai et al. | 725/133 |
| 2006/0156341 A1 | 7/2006 | Kim | |
| 2006/0248562 A1 | 11/2006 | Kitsukawa et al. | |
| 2007/0074245 A1 | 3/2007 | Nyako et al. | |
| 2007/0116428 A1 * | 5/2007 | Choi | 386/83 |
| 2007/0288956 A1 | 12/2007 | Bang | |
| 2008/0022310 A1 | 1/2008 | Poling et al. | |

OTHER PUBLICATIONS

UAV=User Aggregated Video http://www.videosticky.com/blog/?s=aggregation.
The Virtual Channel Model for Personalized Television http://www.spinellis.gr/pubs/conf/2003-ECITV-VCM/html/CLS03b.htm.
PHIZ: Discovering TVs Long Tail through a Channel—Centric Model http://www.hpl.hp.com/techreports/2005/HPL-2005-84.pdf.
Virtual Personalized Channels: Video Conducting of Future TV Broadcasting http://www.khm.de/~georg/texte/2005-ewimt-London.pdf.

* cited by examiner

*Primary Examiner* — Pankaj Kumar
*Assistant Examiner* — Sahar Baig
(74) *Attorney, Agent, or Firm* — Vierra Magen Marcus & DeNiro LLP

(57) ABSTRACT

The technology is a system and method for generating a virtual channel in an electronic program guide. Scheduling instructions, which are configured by a user, indicate content that should be presented for selection in the virtual channel. The scheduling instructions are executed in priority order. The virtual channel is populated with content descriptions based on the execution of the scheduling instructions. After the virtual channel is initially populated with content, broadcasting gaps in the virtual channel are identified. In one embodiment, each broadcasting gap is populated with other content based on a broadcast gap setting set by the user. In another embodiment, each broadcasting gap remains an empty schedule entry in the virtual channel. An electronic document associated with the virtual channel may be published to a third-party website so that other users may subscribe to the virtual channel.

13 Claims, 10 Drawing Sheets

| Today | 9:00 PM | 9:30 PM | 10:00 PM | 10:30 PM |
|---|---|---|---|---|
| 35 FOOD | Dinner:Imposs... | Dinner:Imposs... | Good Eats | 30 Minute Meals |
| 36 FX-N | That '70s Show | | Damages | |
| 37 TNT | Forrest Gump | | In Good Company | |
| 38 ESPN | SportsCenter | | SportsCenter | |
| 39 ESPN2 | World Series of Poker | | World Series of Poker | |
| 40 FSN | FSN Final | FSN Final | Best Damn Sports Show | |
| 41 Stuff Joe Likes | South Park | South Park | Unscheduled | My Name is Earl |

| Today | 9:00 PM | 9:30 PM | 10:00 PM | 10:30 PM |
|---|---|---|---|---|
| 35 FOOD | Dinner:Imposs... | Dinner:Imposs... | Good Eats | 30 Minute Meals |
| 36 FX-N | That '70s Show | That '70s Show | Damages | |
| 37 TNT | Forrest Gump | | In Good Company | |
| 38 ESPN | SportsCenter | | SportsCenter | |
| 39 ESPN2 | World Series of Poker | | World Series of Poker | |
| 40 FSN | FSN Final | FSN Final | Best Damn Sports Show | |
| 41 Stuff Joe Likes | South Park | South Park | Lost | |

Fig. 3

| Today | 10:00 AM | 10:30 AM | 11:00 AM | 11:30 AM |
|---|---|---|---|---|
| 35 FOOD | 30 Minute Meals | 30 Minute Meals | Good Eats | |
| 36 FX-N | That '70s Show | That '70s Show | Damages | |
| 37 TNT | Say Anything | | In Good Company | |
| 38 ESPN | SportsCenter | | SportsCenter | |
| 39 ESPN2 | World Series of Poker | | World Series of Poker | |
| 40 FSN | FSN Final | FSN Final | MLB Baseball | |
| 41 NASCAR | NASCAR Trackside | NASCAR Victory Lap | Daytona 500 | |

CUSTOM CHANNELS

BACKGROUND

Users of television systems and other media systems often search for a particular television program or other type of media content through an electronic program guide (EPG). As the number of television channels increases, along with the amount of available content, searching for specific content becomes increasingly difficult and time-consuming. Conventional EPGs, such as program guide 10 shown in FIG. 1, use a two-dimensional grid to display program content. The two-dimensional grid has a channel axis and a time axis. The channel axis is oriented vertically and the time axis is oriented horizontally. Multiple channels 12 are displayed along the channel axis and multiple time periods 14 are displayed along the time axis.

A user navigates along either axis to find the desired content. A user can scroll through the available channels using, for example, the up and down buttons on a remote control device. Similarly, the user can scroll through different time periods using left and right buttons on the remote control device. Program guide 10 also displays the date (show as "Today" in FIG. 1) for which program data is displayed.

Figure 1:
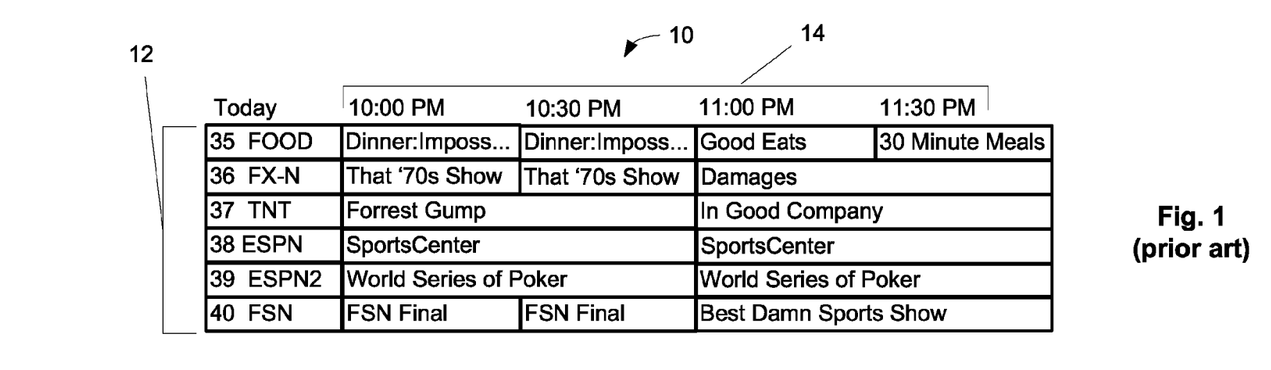
FIG. 1 depicts exemplary electronic program guide (EPG), according to the prior art.

The example of FIG. 1 may contain hundreds of different channels and hundreds of different programs over several days. Thus, the user has a very large two-dimensional grid to navigate when attempting to locate desired program. A significant portion of the programs contained in program guide 10 may not be of interest to the user. However, the user must navigate through these unwanted programs to find the desired program. This navigation can be time-consuming and frustrating to the user.

SUMMARY

One aspect of the present technology is to provide a user with tools necessary to create a virtual channel. The user defines scheduling instruction through a series of user interfaces. Each user interface allows the user to designate what content should be presented for selection on the virtual channel and how often the content should be presented in the virtual channel. The user interfaces also allow the user to define broadcast gap settings indicating what content should be displayed in the event that a broadcast gap exists after all the content has been presented for selection in the virtual channel. The user interface further allow the user to define priority settings indicating which content shall be presented for selection in the virtual channel in the event that more than one piece of content may be presented for selection at overlapping broadcast times.

One aspect of the present technology is to display a virtual channel in an electronic program guide. The scheduling instructions defined by a user, which indicate when a program should be presented for selection in the virtual channel, are determined by a computer system. The computer system executes these scheduling instructions in priority order. Content is displayed for selection in the virtual channel based on the executed scheduling instructions. Broadcast gaps are identified after the virtual channel is populated, and in one embodiment, content is displayed for selection in each of these broadcast gaps. In another embodiment, each broadcast gap remains empty and cannot be selected by the viewer.

One aspect of the present technology is to publish a virtual channel. The user, after saving the scheduling requests, may choose to publish the virtual channel such that other users may subscribe to the channel. In this case, the user may serialize the scheduling requests to, in one embodiment, an XML file. The XML file can be published on a website, to a virtual channel service or in a social community network. A link to the XML file may be published to any of these sites instead of the entire XML file. Other users may obtain the file or link in order to generate the virtual channel on their EPG. Updates to the virtual channel may be automatically sent to any users that have subscribed to the virtual channel.

DETAILED DESCRIPTION

The technology described herein generates and displays a virtual channel in an electronic program guide (EPG) based on scheduling instructions defined by a publisher. The scheduling instructions specify, among other things, the content that will be presented for selection in the virtual channel, content priority, conflict resolution and how to fill in broadcasting gaps. The virtual channel may be published so that another user may subscribe to the virtual channel.

A virtual channel contains a listing of programs and other content that satisfy various preferences set by a user. Thus, the virtual channel contains programs and other content that the user would most likely want to access. The virtual channel may aggregate programs from multiple sources (e.g., broadcast channels, video on demand (VoD), IPTV channels, and the like). Additionally, the virtual channel may contain other content, such as music, images, games, event reminders from a personal calendar, and the like. Although particular examples discussed herein relate to virtual channels displaying program content, a virtual channel may aggregate any type of content or data received from any number of different sources via any communication mechanism.

Figure 2A:
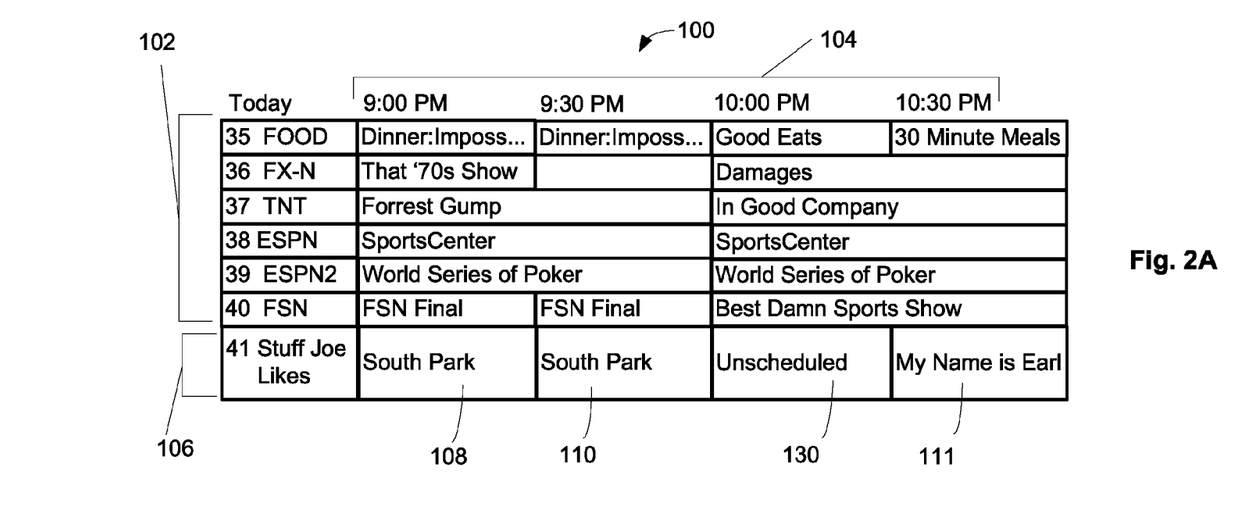
FIGS. 2A-2B each depict an embodiment of an exemplary EPG displaying a virtual channel.

FIG. 2A illustrates an embodiment of an EPG 100 that simultaneously displays programs broadcast on non-virtual channels 102 (channels 35-40) and programs presented for selection on a virtual channel 106 (channel 41). As will be discussed in more detail later, the virtual channel 106 was created by a publisher, and has been assigned channel 41 by the EPG. The virtual channel 106 may include scheduled programs (e.g., programs that begin at a specified time) and unscheduled programs, such as on-demand programs that are accessible at any time. On-demand content includes, for example, programs stored in a video library, music video tracks stored in an album database, or recorded television programs stored on a client device. Each thirty-minute time period displayed in the virtual channel is referred to herein as a "schedule entry."

The virtual channel 106, in the example provided in FIG. 2A, includes the title "Stuff Joe Likes," and presents the following content for selection: a first episode of "South Park"® 108, a second episode of "South Park"® 110 and an episode of "My Name is Earl"® 111. A broadcast gap 130 exists between the schedule entry 110 and the schedule entry 111. The program "South Park"® is broadcast on the Comedy Central network. The program "My Name is Earl"® is broadcast on the Turner Broadcasting System (TBS) network. All three episodes are aggregated on the virtual channel 106. Each episode of "South Park" occupies a single schedule entry.

Figure 2B:
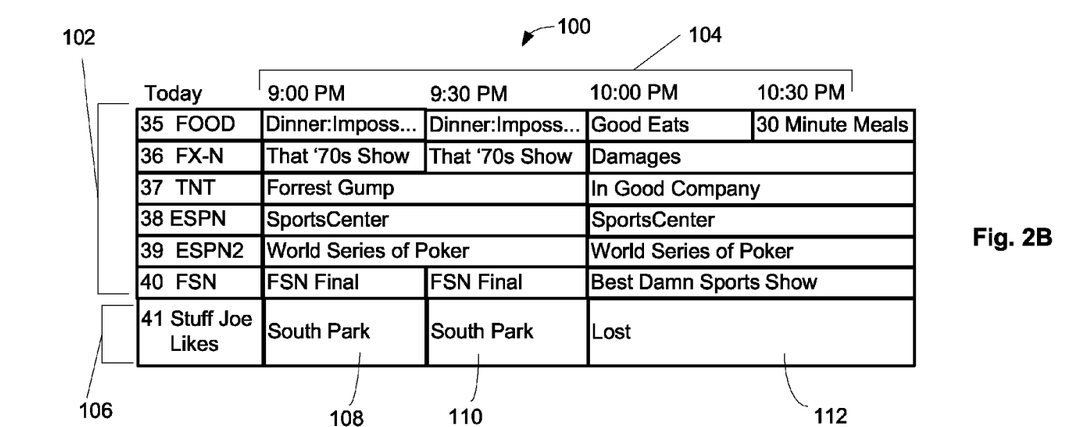

The virtual channel 106, in the example provided in FIG. 2B, includes the title "Stuff Joe Likes," and presents the following content for selection: a first episode of "South Park"® 108, a second episode of "South Park"® 110 and an episode of "Lost"® 112. The program "South Park"® is broadcast on the Comedy Central network. The program "Lost"® is broadcast on the American Broadcast Corporation (ABC) network. All three episodes are aggregated on the virtual channel 106. Each thirty-minute episode of "South Park" occupies a single schedule entry while the one-hour episode of "Lost" occupies two schedule entries.

Figure 3:
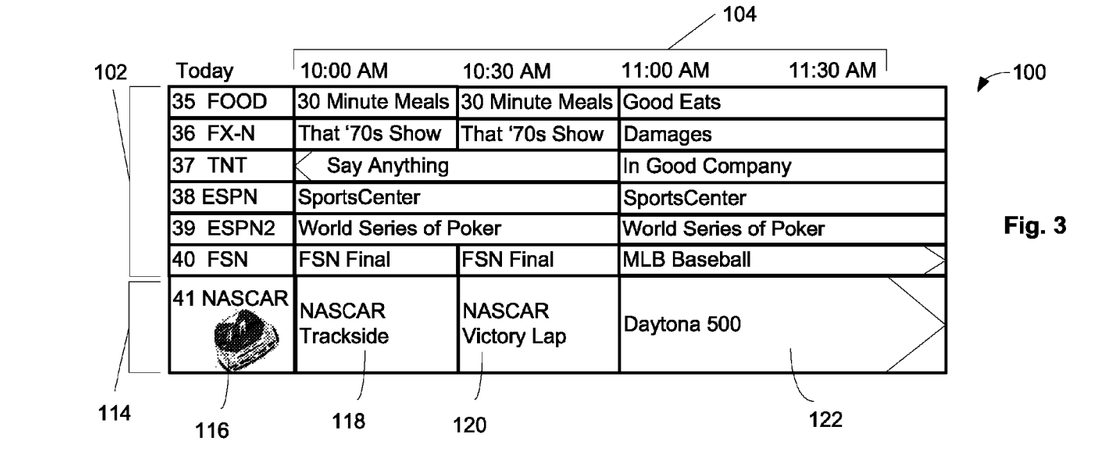
FIG. 3 depicts an EPG displaying another embodiment of a virtual channel.

FIG. 3 illustrates another embodiment of displaying a virtual channel in the EPG 100. In FIG. 3, virtual channel 114 created by a publisher includes the title "NASCAR" and presents the following content for selection: an episode of "NASCAR Trackside" 118, an episode of "NASCAR Victory Lap" 120 and a live broadcast of the Daytona 500 event 122. The publisher has also chosen to display a graphic 116 in the virtual channel title block. FIG. 3 illustrates the graphic 116 as a race car. The graphic 116 is exemplary and may include any other graphic including, but not limited to, a video clip or streaming video. The program "NASCAR Trackside" 118 and "NASCAR Victory Lap" 120 is broadcast on the SPEED Channel. The Daytona 500 is broadcast on ABC. All three pieces of content have been aggregated on the virtual channel 114.

Any user may create a virtual channel. A user that creates a virtual channel is referred to herein as a publisher. The technology described herein provides the user with tools to create and publish a virtual channel. The publisher controls what content is presented for selection in the virtual channel. The virtual channel is content driven, which prevents the publisher from having to choose the content that will be presented in the virtual channel every day.

Figure 4:
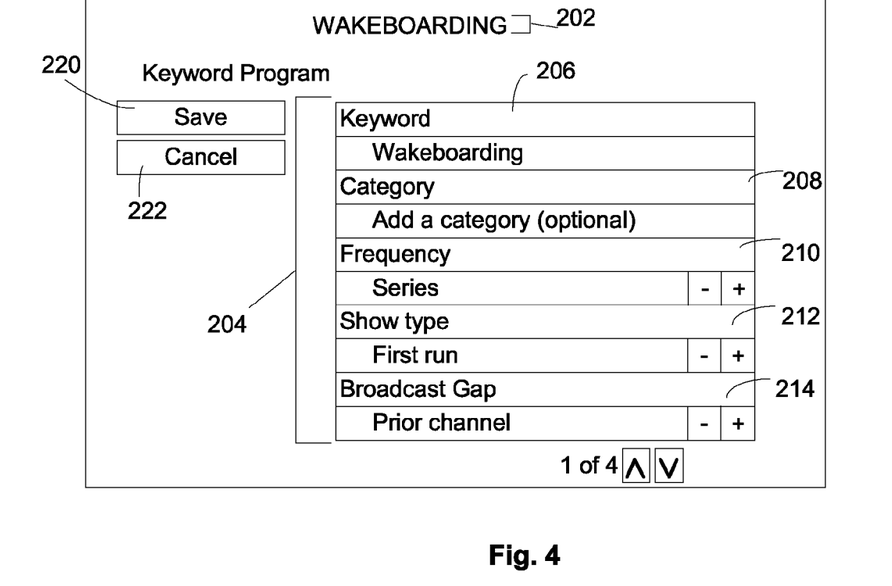
FIG. 4 depicts an exemplary user interface for designating a keyword broadcasting request.
Figure 5:
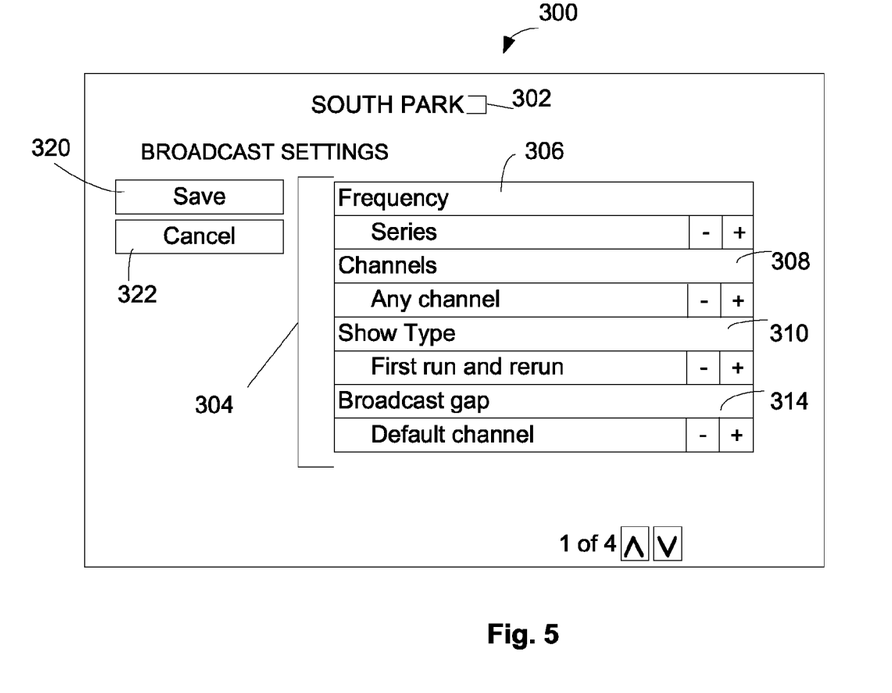
FIG. 5 depicts an exemplary user interface for designating a series broadcast request.

FIGS. 4-5 each illustrate exemplary user interfaces that a publisher may use to create a virtual channel. FIG. 4 illustrates a user interface 200. With the user interface 200, a publisher may choose to display all content containing a certain keyword 202 for selection in the virtual channel. In the example provided in FIG. 4, the publisher has designated that all programs containing the word "wakeboarding" be displayed for selection in the virtual channel. The word "wakeboarding" may be located in, for example, the program title or in metadata associated with the program. The broadcast settings 204 that may be configured in the user interface 200 include a keyword setting 206, a category setting 208, a frequency setting 210, a show type setting 212 and a broadcast gap setting 214.

The keyword setting 206 displays the word the publisher entered in a prior user interface (not shown). The category setting 208 acts as a filter for the type of programs that will be identified. If a user enters the keyword "Kobe Bryant," the category setting 208, if set to "sports," would not record The Oprah Winfrey show with Kobe Bryant as a guest. The frequency setting 210 controls how often a program is displayed for selection in the virtual channel. The show type setting 212 controls whether first run or repeat episodes (also referred to as "reruns") of a program are displayed for selection in the virtual channel. These settings are exemplary and the user interface 200 is not limited to these settings. By selecting the save button 220, scheduling instructions (also referred to as a scheduling request) are created based on the settings 204. As will be discussed in more detail later, scheduling instructions based on the settings 204 shown in FIG. 4 will display original episodes containing the word "wakeboarding" for selection in the virtual channel.

At the time of designating the keyword "wakeboarding" in the keyword setting 206, the publisher is likely not aware of the broadcast times of each program that will be displayed for selection in the virtual channel. If the virtual channel displays content for selection for a fourteen day period, the virtual channel contains a total of six hundred seventy-two schedule entries. It is also unlikely that the programs displayed in the virtual channel will fill every schedule entry of the virtual channel based solely on the scheduling requests set by the publisher. Thus, the virtual channel will have several broadcast gaps, or dead-air, between schedule entries after the virtual channel is initially populated with such programs.

The broadcast gap setting 214 allows the publisher to choose what content should be displayed for selection during each empty schedule entry. The broadcast gap setting 214 in the user interface 200 shown in FIG. 4 is set to "prior channel." The "prior channel" selection designates that content will be displayed for selection in an empty schedule entry that is being aired on the same channel as the prior schedule entry. Using the example provided in FIG. 2A, if the broadcast gap setting 214 is set to "prior channel," the virtual channel would display the title of the program being broadcast on the same channel as schedule entry 110. In other words, if "South Park" (schedule entry 110) was broadcast on Comedy Central, the virtual channel, in schedule entry 130, would display whatever program is being broadcast on Comedy Central during the airing time 10:00 PM-10:30 PM. By way of example only, the broadcast gap setting 214 may also be set to "default channel" and "no channel."

With reference to FIG. 5, a user interface 300 provides a tool to the publisher for creating content-specific scheduling instructions. FIG. 5 provides an example of creating series broadcast scheduling instructions. In the user interface 300, the publisher has designated that the television series "South Park" should be displayed for selection in the virtual channel. The title 302 of the television series is displayed in the user interface 300. The user interface 300 allows the publisher to set the broadcast settings 304. The broadcast settings 304 shown in FIG. 5 include a frequency setting 306, a channel setting 308, a show type setting 310, an airtime setting 312 and a broadcast gap setting 314.

The frequency setting 306 controls how often the program should be displayed for selection in the virtual channel. The options available in the frequency setting 306 include "single show" and "series." If the frequency setting 306 is set to "single show," only one episode of "South Park" will be displayed for selection in the virtual channel. If the frequency setting 306 is set to "series," every episode of "South Park" will be displayed for selection in the virtual channel (subject to the show title setting 310). The channel setting 308 controls whether a program should be displayed in the virtual channel when the program is broadcast on any channel or only when it is aired on a specific channel. The show type setting 310 controls whether first run or repeat episodes (also referred to as "reruns") of the program 302 are displayed for selection in the virtual channel. These settings are exemplary, and the user interface 300 is not limited to these settings.

The broadcast settings 304 shown in FIG. 5 affect how often the program "South Park" will be displayed for selection in the virtual channel. In FIG. 5, the frequency setting 306 is set to "Record Series" and the show type setting 310 is set to "first run and reruns. The combination of these two settings designates that all episodes of "South Park" available in the program guide (e.g., Zap2it) will be displayed for selection in the virtual channel. The channel setting 308 is set to "Any channel," which designates that episodes of "South Park" should be displayed in the virtual channel when the program is broadcast on any channel. The publisher may save these settings 304 by selecting the save button 320. If the publisher does not want to save these settings, the publisher may select the cancel button 322.

The broadcast gap setting 314 is similar to the broadcast gap setting 214 shown in FIG. 2. In FIG. 5, the broadcast gap setting 314 is set to "default channel." The "default channel" setting allows the publisher to designate that, for each empty schedule entry, content from a specific broadcast channel (or any other source) will be displayed in the virtual channel. In one embodiment, the publisher can designate that whatever program is being broadcast on ABC during an empty schedule entry will be displayed for selection in the virtual channel. Using the example provided in FIG. 2A, the virtual channel would display whatever program is being broadcast on ABC between 10:00 PM-10:30 PM for selection as schedule entry 130. In an alternative embodiment, the publisher can also select that content from a video on demand (VoD) channel may fill in the broadcast gaps. By way of example only, the publisher could designate a single episode of VoD content to a specific broadcast time, designate the entire series of VoD content to a recurring broadcast time or designate the VoD channel to fill-in any broadcast gaps (e.g., the content on the VoD channel would round-robin through the available broadcast gaps).

Figure 6:
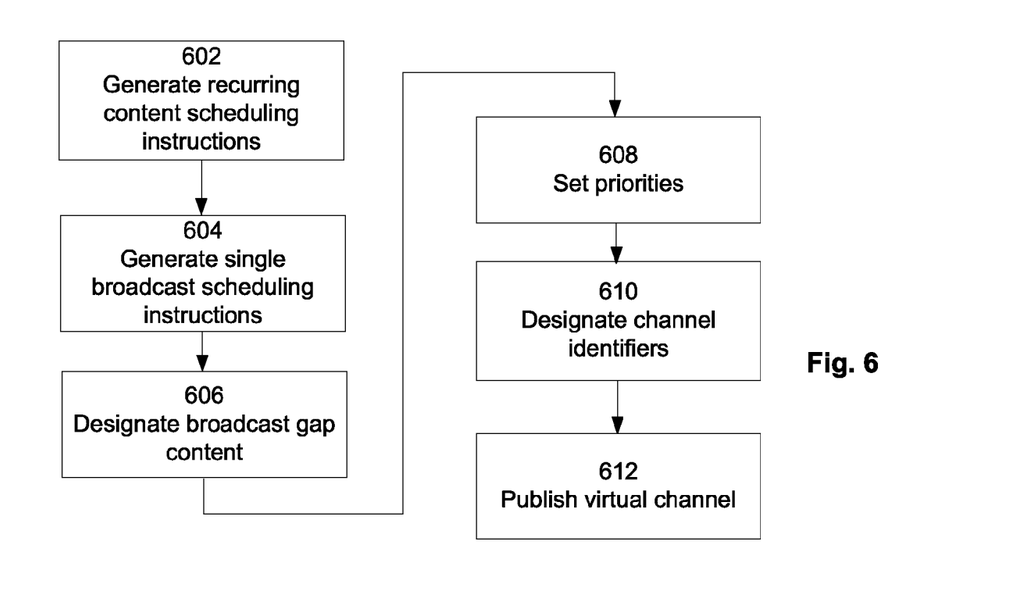
FIG. 6 depicts a flow diagram providing exemplary steps for creating and publishing a virtual channel.

FIG. 6 illustrates exemplary steps for creating and publishing a virtual channel. In step 602, the publisher designates what recurring content should be presented for selection in the virtual channel. Recurring content comprises content that the publisher wants displayed for selection in the virtual channel every time the content is broadcast by a non-virtual channel. The publisher may designate recurring content in several ways. Using the examples provided in FIGS. 4-5, recurring content may be designated through user interface 200 or user interface 300 by selecting "series" in the frequency setting 210 or 306. The publisher may also designate to display recurring content by scheduling content broadcast on a certain channel at a specific time be displayed for selection in the virtual channel. By way of example only, the publisher, using another user interface (not shown), can designate that the virtual channel should display content being broadcast on ABC every Tuesday night between 8:00 PM-9:00 PM for selection in the virtual channel.

In step 604, the publisher designates what, if any, single broadcast content should be displayed for selection in the virtual channel. Using the example provided in FIG. 5, the publisher may designate to display a single broadcast of "South Park" for selection in the virtual channel by changing the frequency setting 306 from "series" (as shown in FIG. 5) to "single broadcast." In this case, the show type setting 310 and airtime setting 312 are not available upon changing the frequency setting 306 to "single broadcast." The virtual channel will display the episode of "South Park" the user selected in the EPG.

In step 606, the publisher designates what content, if any, should be displayed in empty scheduling entries. Using the examples provided in FIGS. 4-5, the publisher may set the broadcast gap settings 214 and 314 to "prior channel," "default channel" or "no channel." The "prior channel" and "default channel" settings were described above. If the "no channel" setting is selected, no content is displayed in each empty scheduling entry. Instead, the message "unscheduled" is displayed in the virtual channel that cannot be selected in the EPG.

In step 608, the content priorities are configured. The publisher has several options for designating content priority. The publisher can designate that content priority is determined by executing scheduling requests in order. The publisher may also select a particular piece of content as the highest-priority content (e.g., Joe really does not want to miss an episode of "South Park"). In this case, every schedule request associated with "South Park" will be executed first and the remaining scheduling requests will be executed in order the requests were created.

Figure 15:
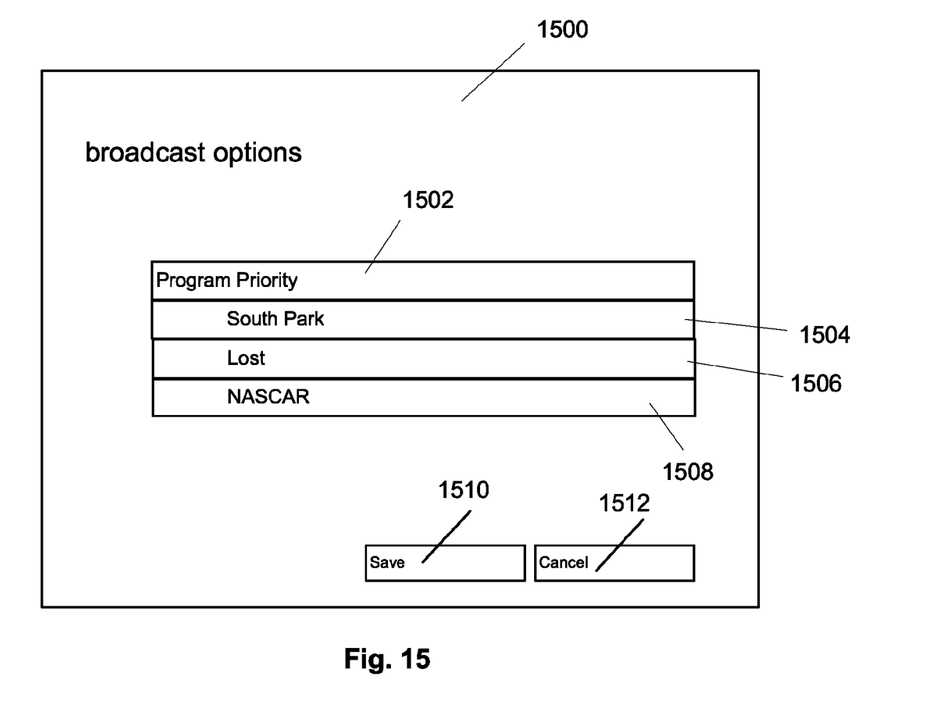
FIG. 15 depicts an exemplary user interface for designating broadcast priorities.

FIG. 15 provides an exemplary user interface 1500 that allows the publisher to set these priorities. In the user interface 1500, the publisher designates the program priority 1502 in the event that conflicts arise (e.g., two or more episodes overlap a single schedule entry). In the user interface 1500, the publisher has designated that "South Park" episodes are the highest priority (entry 1504), episodes of "Lost" are the second highest priority (entry 1506) and any episode related to NASCAR is the third highest priority (entry 1508). The priorities may be saved by selecting the save button 1510 or erased by selecting the cancel button 1512. These priorities may be changed through, for example, a drag-and-drop interface or any other graphic interface known in the art.

In step 610, the channel identifiers are configured. FIGS. 2-3 illustrate that channel identifiers may include a title ("Stuff Joe Likes") and a graphic (race car). Channel identifiers may include other characteristics such as, but not limited to, a description, an author and so on. Each of these characteristics may be customized by the publisher. In the EPG shown in FIG. 2A, the publisher has customized the title of the virtual channel 106 to "Stuff Joe Likes." In the EPG shown in FIG. 3, the publisher has customized the title of the virtual channel 114 to "NASCAR" and added the race car graphic 116. The description associated with the virtual channel is viewable upon selecting the virtual channel in the EPG. In the FIG. 3 example, a description such as "All NASCAR, all the time. Live NASCAR events and NASCAR themed programming broadcast on SPEED, ESPN, FOX and ABC" may be associated with the virtual channel. The publisher of the virtual channel may want recognition for creating the channel. In this case, the publisher can list him/herself as the author of the virtual channel by entering, for example, the publisher's actual name, community ID, nickname, and the like. The publisher may also provide the ability for users to rate the virtual channel and show a community rating to the virtual channel.

In step 612, the virtual channel is published. In one embodiment, each of the user interface settings discussed above are exported into an XML file. The publisher can then publish a link to the XML file on, by way of example only, a website, a virtual channel service and in a virtual community (e.g., Facebook, MySpace, etc.). Once published, other users may subscribe to the virtual channel by downloading the XML file or obtaining a link to the XML file. Any updates made to the virtual channel by the publisher can be automatically sent to any users that have subscribed to the virtual channel. The XML file does not have to be shared. A publisher may create a virtual channel for their own personal consumption. In this case, the XML file would be stored on the publisher's personal computer, set-top box, and the like.

FIGS. 7-10 illustrate exemplary steps of displaying content for selection in a virtual channel. As discussed above, a user may subscribe to a virtual channel and/or create a virtual channel for the user's own personal use. For the purpose of describing this technology only, a user has obtained an RS feed to the XML file. Every time the user launches the EPG, the RSS feed accesses the XML file to populate the virtual channel with updated content (since the last time the EPG was launched).

Figure 7:
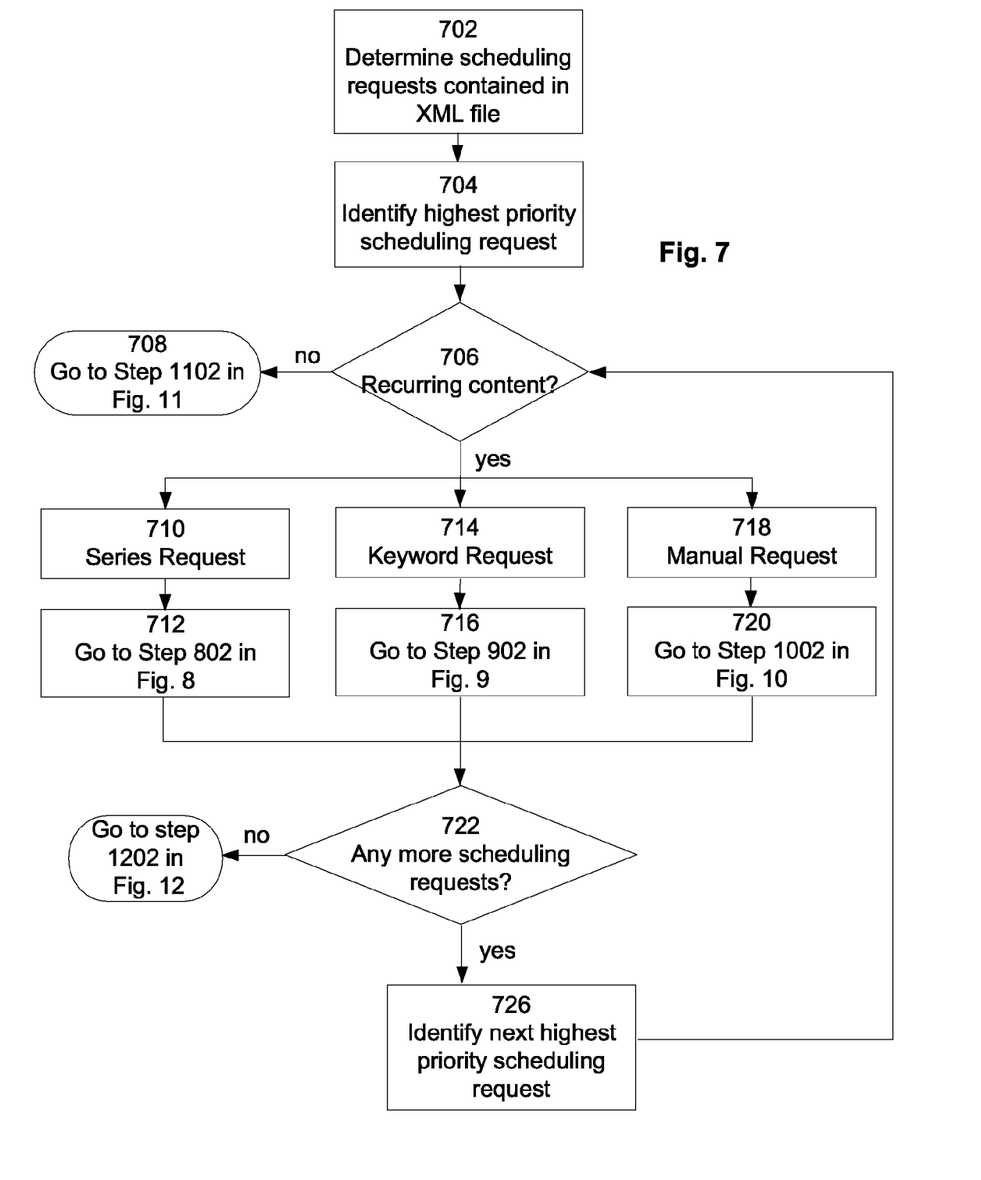
FIG. 7 depicts a flow diagram providing exemplary steps for displaying content for selection in a virtual channel.

In step 702, the scheduling requests contained in the XML file are obtained. In step 704, the highest priority scheduling request is identified. For the purpose of describing the technology only, the highest priority scheduling request contained in the XML document is the broadcast request associated with the program "South Park" (settings shown in FIG. 5).

In step 706, it is determined if the highest priority scheduling request is associated with recurring content. Because the highest priority scheduling request is associated with recurring content and is a broadcast request (step 710), the broadcast request is executed, in step 712. Additional details of executing the broadcast request will be provided later. After populating the virtual channel with schedule entries for "South Park," it is determined whether any more scheduling requests exist in the XML file, in step 722. If there are no further scheduling requests contained in the XML file, the empty schedule entries are identified and populated with content for selection in the virtual channel according to the broadcast gap setting 314 (see FIG. 12). Here, however, using the examples provided in FIGS. 4-5 above, additional scheduling requests remain. In particular, the keyword scheduling request (shown in FIG. 4) is next identified in the XML document, in step 726.

Repeating step 706, the keyword scheduling request is identified as a request to schedule recurring content and, in particular, is identified as a keyword scheduling request 714. In step 716, the keyword scheduling request is executed. Additional details of executing the scheduling request is provided later herein. After populating the virtual channel with schedule entries of content containing the word "wakeboarding," it is determined that there are no further schedule requests in the XML file, in step 722. The empty schedule entries are then identified and populated with content for selection in the virtual channel according to the broadcast gap setting 214 (see FIG. 12).

Figure 8:
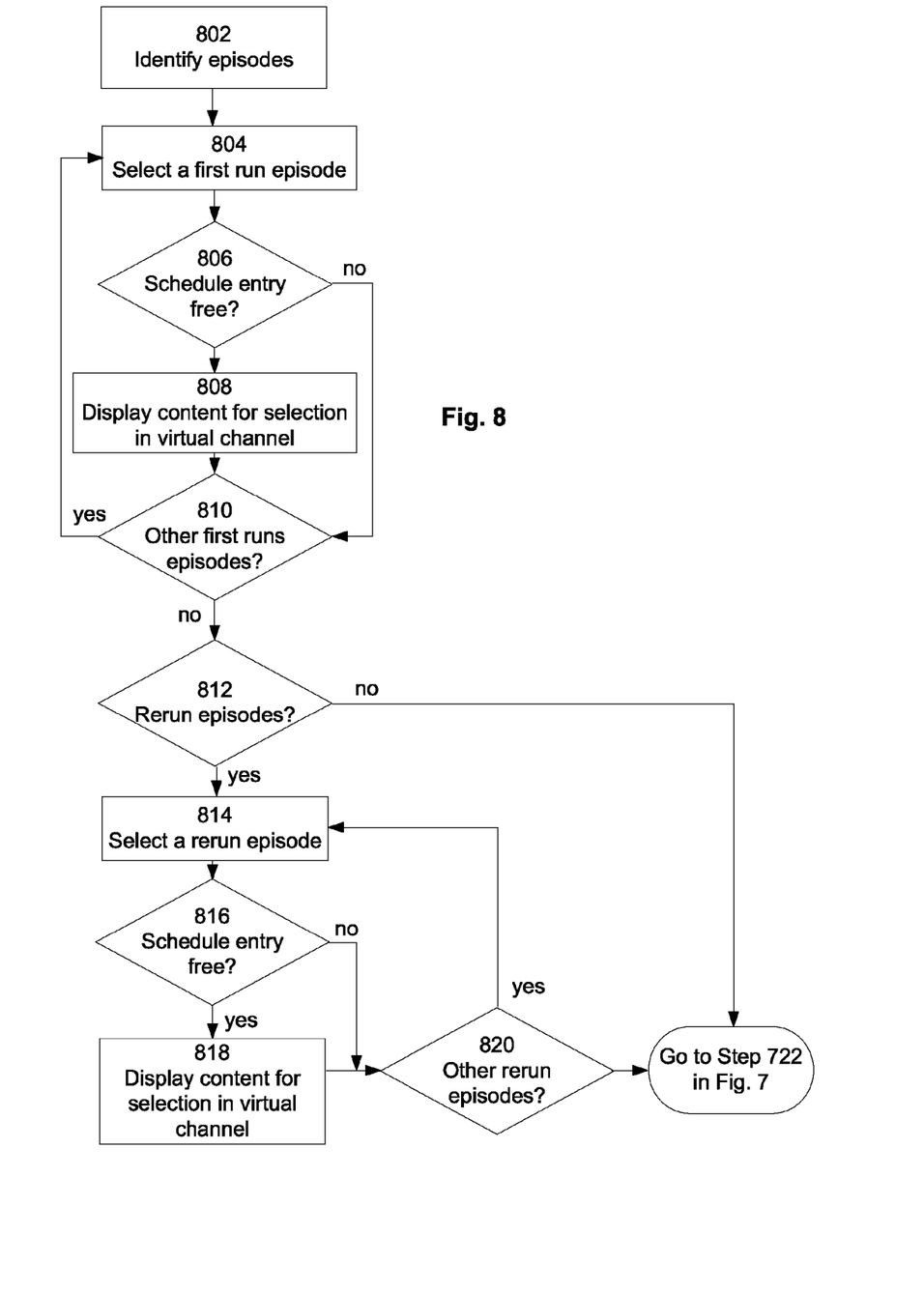
FIG. 8 depicts a flow diagram providing exemplary steps for displaying content for selection in a virtual channel based on a series broadcasting request.

FIG. 8 illustrates exemplary steps for populating a virtual channel with schedule entries based on a broadcast scheduling request. Using the example provided in FIG. 5, the broadcast scheduling request will attempt to display first-run episodes and rerun episodes of the program "South Park" for selection in the virtual channel. In step 802, all episodes of "South Park" are identified. In the case of "South Park," a new thirty-minute episode is aired on Comedy Central every Wednesday at 10:00 PM. If the program guide contains program listings for a fourteen day period, two first-run episodes of "South Park" are identified, in step 802. A first-run episode refers to programming that is broadcast for the first time. For the purpose of describing the technology only, two thirty-minute rerun episodes of "South Park" are also identified in the program guide: this Thursday on Comedy Central airing at 9:00 PM and next Monday on Comedy Central at 12:00 AM.

In step 804, a first-run episode of "South Park" is selected. In step 806, it is determined whether the schedule entry in the virtual channel for Wednesday between 10:00 PM-10:30 PM is available. Because the series broadcast request associated with "South Park" is the first scheduling request, the schedule entry is available in the virtual channel. Thus, in step 808, the first-run episode of "South Park" is displayed for selection in the virtual channel (see schedule entry 108 in FIG. 2). In step 810, it is determined that the second first-run episode of "South Park" needs to be scheduled in the virtual channel. The second episode is selected, in step 804. In step 806, it is determined whether the second Wednesday schedule entry (one week after the first episode) between 10:00 PM-10:30 PM is available in the virtual channel. Again, because the broadcast scheduling request associated with "South Park" is the first scheduling request, only the first episode of "South Park" has been displayed in the virtual channel and all other schedule entries are empty. Thus, the second Wednesday schedule entry between 10:00 PM-10:30 PM is available. In step 810, it is determined that there are no further first-run episodes of "South Park" that need to be scheduled in the virtual channel.

In step 812, it is determined that rerun episodes need to be scheduled in the virtual channel because the setting 310 is set to "first runs and reruns." In step 814, a rerun episode of "South Park" is identified in the program guide. In step 816, it is determined whether the schedule entry associated with next Thursday between 9:30 PM-10:00 PM is available. In step 818, the first rerun of "South Park" is displayed for selection in the virtual channel in the Thursday 9:30 PM schedule entry. In step 820, it is determined that a second rerun episode remains to be scheduled in the virtual channel. In step 820, the second rerun episode is selected for scheduling in the virtual channel. In step 816, it is determined that the schedule entry for next Monday at 12:00 AM is available in the virtual channel. The second rerun episode of "South Park" is displayed for selection in the virtual channel, in step 818. It is determined that no further rerun episodes of "South Park" exist in the program guide (step 820). Thus, it is determined whether any additional scheduling requests exist in the XML file (step 722 in FIG. 7).

Figure 9:
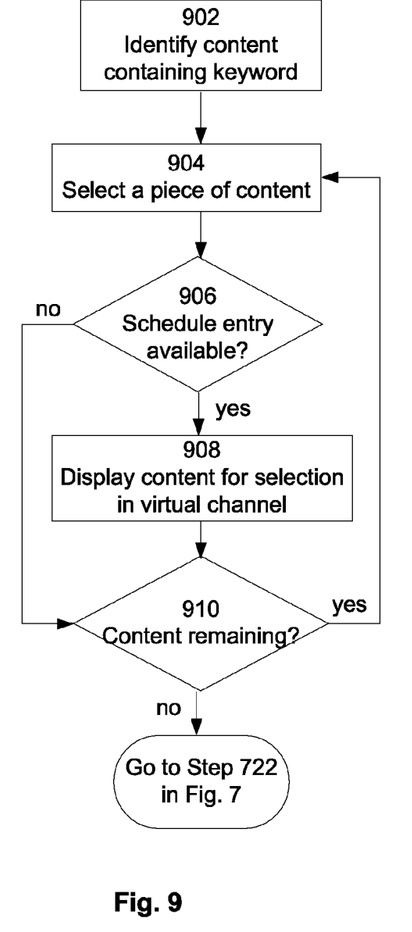
FIG. 9 depicts a flow diagram providing exemplary steps for displaying content for selection in a virtual channel based on a keyword broadcasting request.

FIG. 9 illustrates exemplary steps of displaying content for selection in a virtual channel based on a keyword scheduling request. In step 902, all episodes containing the keyword are identified in the program guide (e.g., in program title, in metadata associated with program, etc.). Using the example provided in FIG. 4, episodes containing the word "wakeboarding" are identified in the program guide. For the purpose of describing this technology only, two programs containing the word "wakeboarding" are identified in the program guide: a first-run episode of the Pro Wakeboard Tour ("wakeboarding" in description), airing this Saturday between 10:00 AM-11:00 AM and a rerun episode of the Wakeboard World Cup Series ("wakeboarding" in metadata), airing this Wednesday between 9:00 PM-10:00 PM. In step 904, the Pro Wakeboard Tour episode is selected.

At this point, four schedule entries of the virtual channel display content for selection. Two first-run episodes and two rerun episodes of "South Park" are displayed for selection in the virtual channel. The rest of the schedule entries remain empty. In step 906, it is determined that the schedule entry associated with the Pro Wakeboard Tour episode is available. In step 908, the Pro Wakeboard Tour episode is displayed for selection in the virtual channel. If, however, a schedule entry already existed in the virtual channel for this time period, the program priority designated by the publisher would determine if the Pro Wakeboard Tour episode would replace the existing schedule entry. Using the example provided in FIG. 15, the Pro Wakeboard Tour episode could not replace any episodes of "South Park," "Lost" or any episodes related to NASCAR.

In step 910, it is determined that content remains to be scheduled and the Wakeboard World Cup Series episode is selected (step 904). In step 906, it is determined that both the Wednesday 9:00 PM-9:30 PM schedule entry and the Wednesday 9:30 PM-10:00 PM schedule entry are not available. The first-run episode of "South Park" is displayed for selection in the 9:00 PM-9:30 PM schedule entry and the first rerun episode of "South Park" is displayed for selection in the 9:30 PM-10:00 PM schedule entry. Because "South Park" has a higher priority than any program containing the word "wakeboarding," the Wakeboard World Cup Series episode will not be displayed for selection in the virtual channel. In step 910, it is determined that no further content is set to be displayed in the virtual channel. It is then determined whether any additional scheduling requests exist in the XML file (step 722 in FIG. 7).

Figure 10:
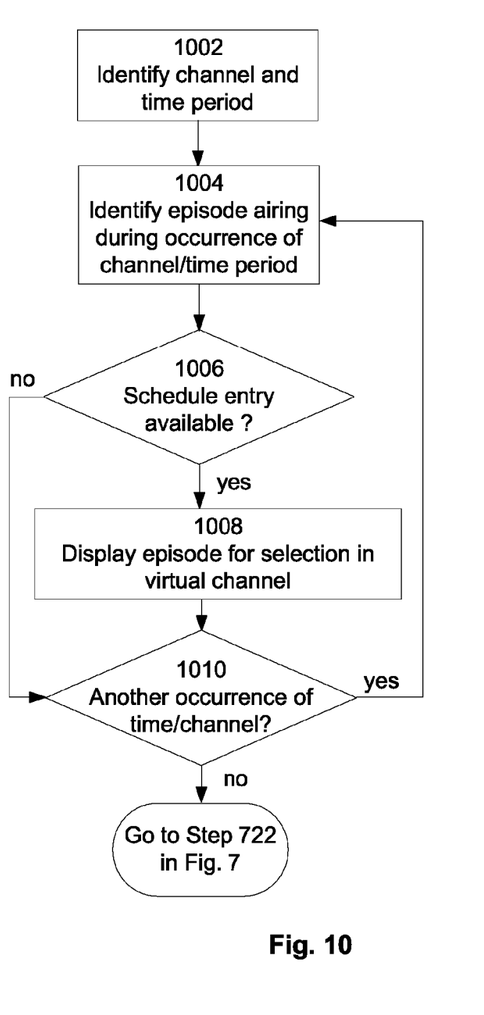
FIG. 10 depicts a flow diagram providing exemplary steps for displaying content for selection in a virtual channel based on a manual recurring request.

FIG. 10 illustrates exemplary steps of displaying content for selection in a virtual channel based on a manual scheduling request. The publisher has also designated (using a user interface) that the virtual channel should display whatever content is being broadcast on ABC (channel 7) every Tuesday night between 8:00 PM-9:00 PM. In step 1002, the channel (channel 7) and time period (8:00 PM-9:00 PM) identified in the manual scheduling request are identified. In step 1004, the program being broadcast on channel 7 between 8:00 PM-9:00 PM is identified. For the purpose of describing this technology only, the program that airs on ABC this Tuesday between 8:00 PM-9:00 PM is "Wipeout." In step 1006, it is determined whether the schedule entry for this Tuesday between 8:00 PM-8:30 PM and the schedule entry between 8:30 PM-9:00 PM is available. Because both schedule entries are available, the "Wipeout" episode is displayed for selection in the virtual channel (step 1008), occupying the two schedule entries from 8:00 PM-9:00 PM (similar to the schedule entry for "Lost" in FIG. 2). If the manual scheduling request is a recurring request (step 1010), the program being broadcast on ABC the following Tuesday is also identified, and steps 1004-1008 (if the schedule entry is available) are repeated. If the manual scheduling request is a single broadcast request, it is determined whether any addition scheduling requests are contained in the XML file, in step 772 (see FIG. 7).

Figures 11, 12:
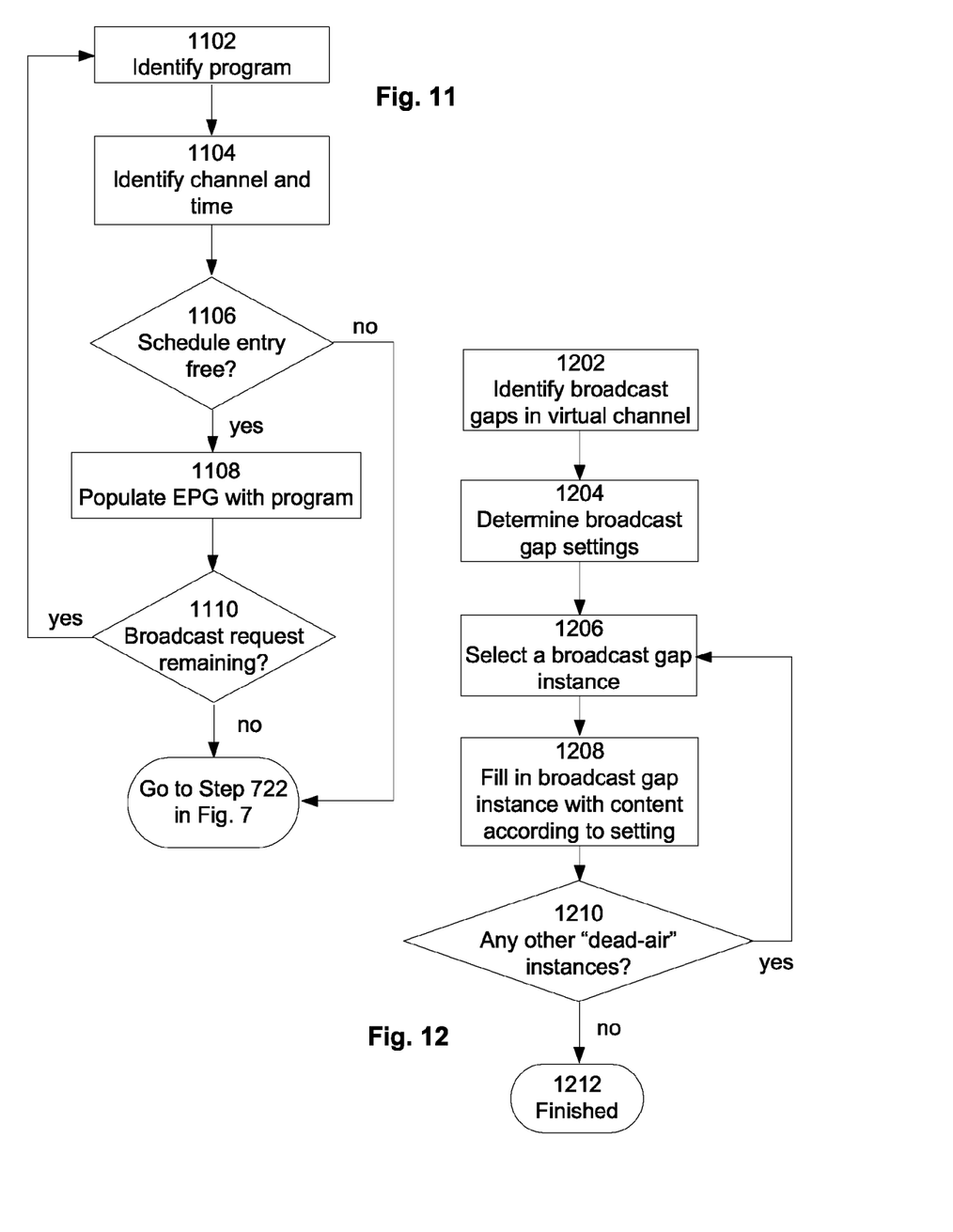
FIG. 11 depicts a flow diagram providing exemplary steps for displaying content in a virtual channel based on a single broadcast request.
FIG. 12 depicts a flow diagram providing exemplary steps for displaying content in a broadcast gap in the virtual channel.

FIG. 11 illustrates exemplary steps of displaying content for selection in a virtual channel based on a single broadcast request. Using the example provided in FIG. 5, the frequency setting 306 would be set to "single broadcast." If the publisher chose a specific airing of "South Park" in the EPG (e.g., channel 35 on Wednesday at 10:00 PM), that single episode will be displayed for selection in the virtual channel. In step 1102, the program "South Park" is identified. In step 1104, the broadcast channel the episode airs on and the air-time is identified. Based on the example provided above, the episode of "South Park" airs on channel 35 and airs on channel 35 between 10:00 PM-10:30 PM. In step 1106, it is determined whether the schedule entry in the virtual channel that corresponds to this Wednesday between 10:00 PM-10:30 PM is available. If this schedule entry is available, "South Park" is displayed for selection in the virtual channel, in step 1108. If the schedule entry in the virtual channel that corresponds to this Wednesday between 10:00 PM-10:30 PM is not available, the virtual channel is not populated with a schedule entry for the "South Park" episode. In step 1110, it is determined if any other single broadcast requests remain. Here, no further single broadcast requests remain. Thus, it is determined whether any addition scheduling requests are contained in the XML file (which returns to step 722 in FIG. 7).

As discussed above, it is likely that broadcast gaps will exist in the virtual channel after the virtual channel is initially populated with content based on the scheduling requests. The publisher has the option to display content for selection in each of these broadcast gaps or maintain the broadcast gaps (e.g., each broadcast gap indicates "unavailable"). FIG. 12 illustrates exemplary steps for displaying content in each empty schedule entry of the virtual channel.

In step 1202, the broadcast gaps in the virtual channel are identified. In step 1204, the broadcast gap setting configured by the publisher is determined. Several broadcast gap settings are available to the publisher. By way of example only, the publisher may choose a default channel setting, a prior channel setting or no channel setting. Each broadcast gap setting determines what content will be displayed for selection in each empty schedule entry, if any at all. The default channel setting allows the publisher to select a specific broadcast channel. Thus, when an empty schedule entry in the virtual channel is identified, content that airs on the predetermined broadcast channel during the time period associated with the broadcast gap will be displayed for selection in the virtual channel. If the prior channel setting is enabled, content that airs on the channel associated with the prior schedule entry will be displayed in the virtual channel during the broadcast gap. If the no channel setting is enabled, the empty schedule entry is not filled-in and an "Unscheduled" message appears in the virtual channel during the broadcast gap period similar to FIG. 2A. Other messages, or no message, may also be displayed in the virtual channel.

In step 1206, a single broadcast gap instance is selected. Using the example provided in FIG. 2A, the broadcast gap 130 during the time period 10:00 PM-10:30 PM is selected. Other broadcast gaps may exist in the virtual channel. In step 1208, content is displayed for selection in the broadcast gap 130 if the broadcast gap setting in set to default channel or prior channel. If the broadcast gap setting is set to default channel, and the publisher pre-selected ABC as the default channel, content being aired on ABC between 10:00 PM-10:30 PM will be displayed for selection in schedule entry 130. The publisher may select any channel. If, on the other hand, the setting is set to prior channel, content being aired on Comedy Central between 10:00 PM-10:30 PM will be displayed for selection in schedule entry 130 because the prior schedule entry 110 is being aired on Comedy Central. If the broadcast gap setting is set to no channel, the broadcast gap 130 will remain as shown in FIG. 2A. If another broadcast gap is remaining in the virtual channel (step 1210), steps 1206-1208 are repeated until no further broadcast gaps exist.

Figure 13:
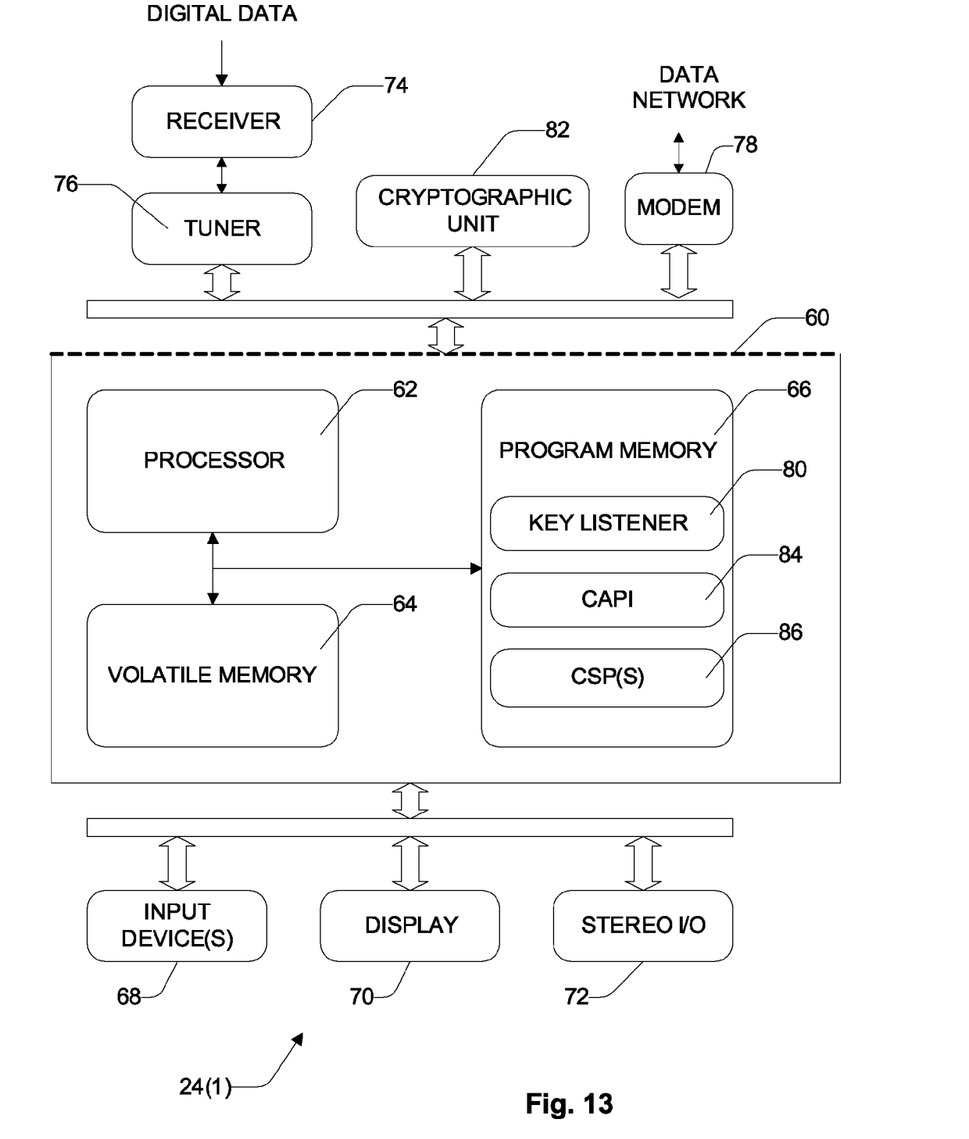
FIG. 13 depicts a block diagram of a digital recording device.

FIG. 13 shows an exemplary configuration of an authorized client 24(1) implemented as a broadcast-enabled computer. It includes a central processing unit 60 having a processor 62, volatile memory 64 (e.g., RAM), and program memory 66 (e.g., ROM, Flash, disk drive, floppy disk drive, CD-ROM, etc.). The client 24(1) has one or more input devices 68 (e.g., keyboard, mouse, etc.), a computer display 70 (e.g., VGA, SVGA), and a stereo I/O 72 for interfacing with a stereo system.

The client 24(1) includes a digital broadcast receiver 74 (e.g., satellite dish receiver, RF receiver, microwave receiver, multicast listener, etc.) and a tuner 76 which tunes to appropriate frequencies or addresses of the broadcast network. The tuner 76 is configured to receive digital broadcast data in a particularized format, such as MPEG-encoded digital video and audio data, as well as digital data in many different forms, including software programs and programming information in the form of data files. The client 24(1) also has a modem 78 which provides access to the data network 28 to provide a back channel or direct link to the content servers 22. In other implementations of a back channel, the modem 78 might be replaced by a network card, or an RF receiver, or other type of port/receiver which provides access to the back channel.

The client 24(1) runs an operating system which supports multiple applications. The operating system is preferably a multitasking operating system which allows simultaneous execution of multiple applications. The operating system employs a graphical user interface windowing environment which presents the applications or documents in specially delineated areas of the display screen called "windows." One preferred operating system is a Windows® brand operating system sold by Microsoft Corporation, such as Windows® XP or Windows® VISTA or other derivative versions of Windows®. It is noted, however, that other operating systems which provide windowing environments may be employed, such as the Macintosh operating system from Apple Computer, Inc. and the OS/2 operating system from IBM.

The client 24(1) is illustrated with a key listener 80 to receive the authorization and session keys transmitted from the server. The keys received by listener 80 are used by the cryptographic security services implemented at the client to enable decryption of the session keys and data. Cryptographic services are implemented through a combination of hardware and software. A secure, tamper-resistant hardware unit 82 is provided external to the CPU 60 and two software layers 84, 86 executing on the processor 62 are used to facilitate access to the resources on the cryptographic hardware 82.

The software layers include a cryptographic application program interface (CAPI) 84 which provides functionality to any application seeking cryptographic services (e.g., encryption, decryption, signing, or verification). One or more cryptographic service providers (CSPs) 86 implement the functionality presented by the CAPI to the application. The CAPI layer 84 selects the appropriate CSP for performing the requested cryptographic function. The CSPs 86 perform various cryptographic functions such as encryption key management, encryption/decryption services, hashing routines, digital signing, and authentication tasks in conjunction with the cryptographic unit 82. A different CSP might be configured to handle specific functions, such as encryption, decryption, signing, etc., although a single CSP can be implemented to handle them all. The CSPs 86 can be implemented as dynamic linked libraries (DLLs) that are loaded on demand by the CAPI, and which can then be called by an application through the CAPI 84.

Figure 14:
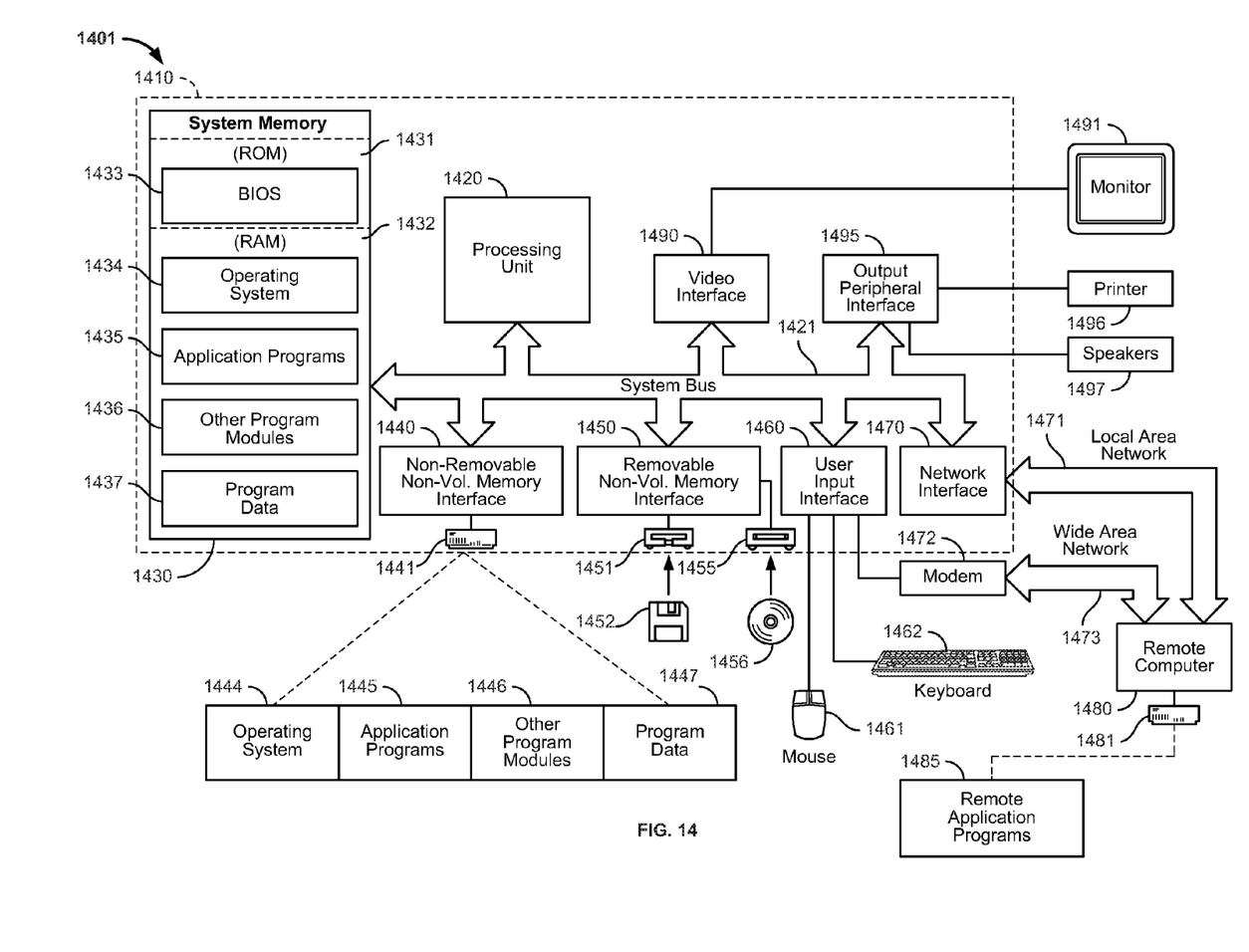
FIG. 14 depicts a block diagram of a computer system for performing the methods described herein.

FIG. 14 illustrates an example of a suitable general computing system environment 1401 for generating a virtual channel. It is understood that the term "processing device" as used herein broadly applies to any digital or computing device or system. The computing system environment 1401 is only one example of a suitable computing environment and is not intended to suggest any limitation as to the scope of use or functionality of the inventive system. Neither should the computing system environment 1401 be interpreted as having any dependency or requirement relating to any one or combination of components illustrated in the exemplary computing system environment 1401.

With reference to FIG. 14, an exemplary system for implementing the inventive system includes a general purpose computing device in the form of a computer 1410. Components of computer 1410 may include, but are not limited to, a processing unit 1420, a system memory 1430, and a system bus 1421 that couples various system components including the system memory to the processing unit 1420. The system bus 1421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1410 may include a variety of computer readable media. Computer readable media can be any available media that can be accessed by computer 1410 and includes both volatile and nonvolatile media, removable and non-removable media. By way of example, and not limitation, computer readable media may comprise computer storage media. Computer storage media includes volatile and nonvolatile, as well as removable and non-removable media implemented in any method or technology for storage of information such as computer readable instructions, data structures, program modules or other data. Computer storage media includes, but is not limited to, random access memory (RAM), read only memory (ROM), EEPROM, flash memory or other memory technology, CD-ROMs, digital versatile discs (DVDs) or other optical disc storage, magnetic cassettes, magnetic tapes, magnetic disc storage or other magnetic storage devices, or any other medium which can be used to store the desired information and which can be accessed by computer 1410.

The system memory 1430 includes computer storage media in the form of volatile and/or nonvolatile memory such as ROM 1431 and RAM 1432. A basic input/output system (BIOS) 1433, containing the basic routines that help to transfer information between elements within computer 1410, such as during start-up, is typically stored in ROM 1431. RAM 1432 typically contains data and/or program modules that are immediately accessible to and/or presently being operated on by processing unit 1420. By way of example, and not limitation, FIG. 14 illustrates operating system 1434, application programs 1435, other program modules 1436, and program data 1437.

The computer 1410 may also include other removable/non-removable, volatile/nonvolatile computer storage media. By way of example only, FIG. 14 illustrates a hard disc drive 1441 that reads from or writes to non-removable, nonvolatile magnetic media and a magnetic disc drive 1451 that reads from or writes to a removable, nonvolatile magnetic disc 1452. Computer 1410 may further include an optical media reading device 1455 to read and/or write to an optical media.

Other removable/non-removable, volatile/nonvolatile computer storage media that can be used in the exemplary operating environment include, but are not limited to, magnetic tape cassettes, flash memory cards, DVDs, digital video tapes, solid state RAM, solid state ROM, and the like. The hard disc drive 1441 is typically connected to the system bus 1421 through a non-removable memory interface such as interface 1440. Magnetic disc drive 1451 and optical media reading device 1455 are typically connected to the system bus 1421 by a removable memory interface, such as interface 1450.

The drives and their associated computer storage media discussed above and illustrated in FIG. 14, provide storage of computer readable instructions, data structures, program modules and other data for the computer 1410. In FIG. 14, for example, hard disc drive 1421 is illustrated as storing operating system 1444, application programs 1445, other program modules 1446, and program data 1447. These components can either be the same as or different from operating system 1434, application programs 1435, other program modules 1436, and program data 1437. Operating system 1444, application programs 1445, other program modules 1446, and program data 1447 are given different numbers here to illustrate that, at a minimum, they are different copies.

A user may enter commands and information into the computer 1410 through input devices such as a keyboard 1462 and a pointing device 1461, commonly referred to as a mouse, trackball or touch pad. Other input devices (not shown) may include a microphone, joystick, game pad, satellite dish, scanner, or the like. These and other input devices are often connected to the processing unit 1420 through a user input interface 1460 that is coupled to the system bus 1421, but may be connected by other interface and bus structures, such as a parallel port, game port or a universal serial bus (USB). A monitor 1491 or other type of display device is also connected to the system bus 1421 via an interface, such as a video interface 1490. In addition to the monitor, computers may also include other peripheral output devices such as speakers 1497 and printer 1496, which may be connected through an output peripheral interface 1495.

The computer 1410 may operate in a networked environment using logical connections to one or more remote computers, such as a remote computer 1480. The remote computer 1480 may be a personal computer, a server, a router, a network PC, a peer device or other common network node, and typically includes many or all of the elements described above relative to the computer 1410, although only a memory storage device 1481 has been illustrated in FIG. 14. The logical connections depicted in FIG. 14 include a local window network (LAN) 1471 and a wide window network (WAN) 1473, but may also include other networks. Such networking environments are commonplace in offices, enterprise-wide computer networks, intranets and the Internet.

When used in a LAN networking environment, the computer 1410 is connected to the LAN 1471 through a network interface or adapter 1470. When used in a WAN networking environment, the computer 1410 typically includes a modem 1472 or other means for establishing communication over the WAN 1473, such as the Internet. The modem 1472, which may be internal or external, may be connected to the system bus 1421 via the user input interface 1460, or other appropriate mechanism. In a networked environment, program modules depicted relative to the computer 1410, or portions thereof, may be stored in the remote memory storage device. By way of example, and not limitation, FIG. 14 illustrates remote application programs 1485 as residing on memory device 1481. It will be appreciated that the network connections shown are exemplary and other means of establishing a communication link between the computers may be used.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method for generating a virtual channel, comprising:
   (a) determining scheduling instructions contained in an electronic document associated with the virtual channel, each scheduling instruction indicates content that should be presented for selection in the virtual channel;
   (b) executing the scheduling instructions in priority order;
   (c) populating the virtual channel with content descriptions based on step (b) of executing the scheduling instructions;
   (d) identifying broadcasting gaps in the virtual channel;
   (e) populating the broadcasting gaps identified in step (d) with other content, said populating the broadcasting gaps identified in step (d) with other content includes the steps of:
      (i) for a first broadcasting gap of the broadcast gaps identified in step (d), identifying other content that is being aired during the time period of the first broadcasting gap; and
      (ii) populating the first broadcasting gap with a highest-priority content among the other content identified in step (e)(i).

2. The method as recited in claim 1, wherein step (a) of determining scheduling instructions contained in a document associated with the virtual channel comprises the step of:
   querying a document that has been published to one of the following: a website, a blog, a virtual community page, a virtual channel service and a file.

3. The method as recited in claim 1, wherein the scheduling instructions contained in the electronic document include at least one of the following: series broadcast scheduling instructions, single broadcast scheduling instructions and keyword scheduling instructions.

4. The method as recited in claim 3, wherein step (b) of executing keyword scheduling instructions comprises the steps of:
   (i) identifying a keyword designated in the scheduling instructions;
   (ii) identifying content containing the keyword available in a program guide; and
   (iii) ranking the content identified in step (b)(ii).

5. The method as recited in claim 4, wherein step (c) of populating the virtual channel with content descriptions comprises the step of:
   populating the virtual channel with content descriptions of at least a portion of highest-ranked content.

6. The method as recited in claim 3, wherein step (b) of executing series broadcast scheduling instructions comprises the steps of:
   (i) identifying a program designated in the scheduling instructions;

(ii) identifying episodes of the program available in a program guide; and (iii) determining types of episodes to present for selection in the virtual channel.

7. The method as recited in claim 6, wherein step (c) of populating the virtual channel with program descriptions comprises the step of:

populating the virtual channel with episode descriptions of at least a portion of the episodes identified in step (b)(ii) based on step (b)(iii) of determining the types of episodes to present for selection in the virtual channel.

8. The method as recited in claim 3, wherein step (b) of executing single broadcast scheduling instructions comprises the steps of:

(i) identifying a channel designated in the scheduling instructions; and (ii) identifying a time period designated in the scheduling instructions.

9. The method as recited in claim 8, wherein step (c) of populating the virtual channel with content descriptions comprises the step of:

populating the virtual channel with a description of a program that airs on the channel identified in step (b)(i) during the time period identified in step (b)(ii).

10. The method as recited in claim 1, wherein step (e) of populating the broadcasting gaps identified in step (d) with other content comprises the step of:

for a second broadcasting gap of the broadcasting gaps identified in step (d), populating the second broadcasting gap in the virtual channel with descriptions of programs that air on a same broadcast channel as a previous schedule entry in the virtual channel.

11. The method as recited in claim 1, wherein step (e) of populating the broadcasting gaps identified in step (d) with other content comprises the step of:

for a third broadcasting gap of the broadcasting gaps identified in step (d), populating the third broadcasting gap in the virtual channel with descriptions of programs that air on a predetermined broadcast channel.

12. A computer storage medium device storing computer executable instructions, which, when executed by a computer comprising one or more processors and a memory, causes the one or more processors to perform a method for generating a virtual channel, the method comprising:

determining scheduling instructions contained in an electronic document associated with the virtual channel, each scheduling instruction indicates content that should be presented for selection in the virtual channel;

executing the scheduling instructions in priority order;

populating the virtual channel with content descriptions based on said executing the scheduling instructions;

identifying broadcasting gaps in the virtual channel; and populating the broadcasting gaps identified in the virtual channel with other content, said populating the broadcasting gaps with other content includes identifying other content that is being aired during the time period of a first broadcasting gap of the broadcasting gaps identified in the virtual channel and then populating the first broadcasting gap with a highest-priority content among the other content identified.

13. A method for generating a virtual channel, comprising:

(a) accessing scheduling instructions contained in an electronic document associated with the virtual channel, each scheduling instruction indicates content that should be presented for selection in the virtual channel and a frequency that the content should be presented for selection in the virtual channel;

(b) executing the scheduling instructions in priority order;

(c) populating the virtual channel with content descriptions based on step (b) of executing the scheduling instructions;

(d) identifying broadcasting gaps in the virtual channel;

(e) populating the broadcasting gaps identified in step (d) with other content, said populating the broadcasting gaps includes the steps of:

(i) identifying other content that is being aired during the time period of a first broadcasting gap of the broadcast gaps identified in step (d);

(ii) prioritizing the other content identified in step (e)(i); and (iii) populating the first broadcasting gap with a highest-priority content among the other content identified in step (e)(i).

\* \* \* \* \*